United States Patent [19]

McKenzie

[11] Patent Number: 4,937,966
[45] Date of Patent: Jul. 3, 1990

[54] FISH HOOK WITH BAIT RETAINER

[76] Inventor: John McKenzie, 1405 Corneta, Austin, Tex. 78721

[21] Appl. No.: 444,281

[22] Filed: Dec. 1, 1989

[51] Int. Cl.⁵ ............................................. A01K 83/06
[52] U.S. Cl. ...................................... 43/44.8; 43/44.2
[58] Field of Search ..................... 43/44.8, 44.2, 42.38

[56] References Cited

U.S. PATENT DOCUMENTS

| | | | |
|---|---|---|---|
| 2,054,976 | 9/1936 | Gould | 43/44.8 |
| 2,503,573 | 4/1950 | Allen | 43/44.8 |
| 3,497,988 | 3/1970 | Childers | 43/43.4 |
| 3,760,526 | 9/1973 | Hicks | 43/44.8 |
| 3,778,920 | 11/1973 | Anton | 43/44.4 |
| 3,879,886 | 12/1975 | Thomas | 43/44.6 |
| 4,471,558 | 4/1984 | Garcia | 43/44.4 |
| 4,688,347 | 3/1987 | Krogmann | 43/44.8 |
| 4,713,908 | 5/1987 | Corbitt | 43/43.4 |
| 4,785,571 | 11/1988 | Back | 43/44.4 |

Primary Examiner—Richard K. Seidel
Assistant Examiner—James Miner
Attorney, Agent, or Firm—Walter C. Farley

[57] ABSTRACT

A bait-retaining fishhook includes a metal fishhook having an elongated, curved body with a line-retaining eye at one end and a point at the other end and a bait retaining member attached thereto. The bait retainer is an elongated piece of flexible thermoplastic material such as monofilament fishing line attached at one end to the body of the hook adjacent the point, the other end of the line extending away from said body portion. When bait is placed on the fishhook, and particularly when force is applied to pull the bait from the hook, the bait retaining member is separated from the body portion and inhibits removal of the bait from the hook. The assembly is made by heating the hook above the softening point of the line and touching an end of the line to the heated hook, thereby melting the end of the line onto the hook body, forming a secure connection.

7 Claims, 2 Drawing Sheets

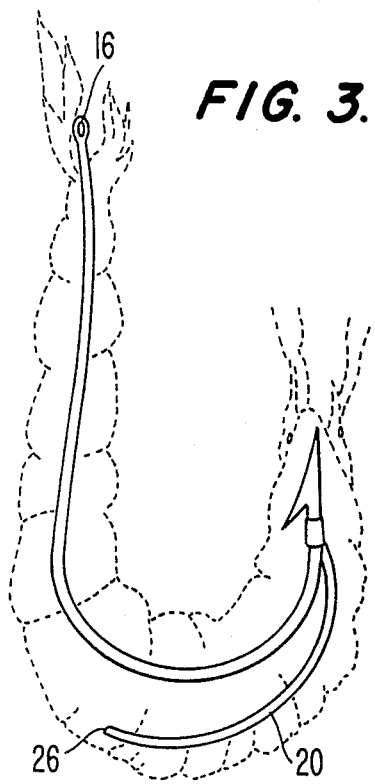
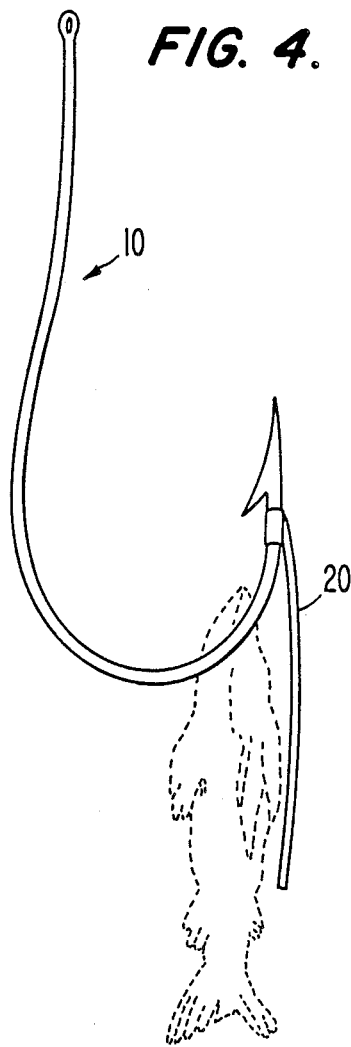
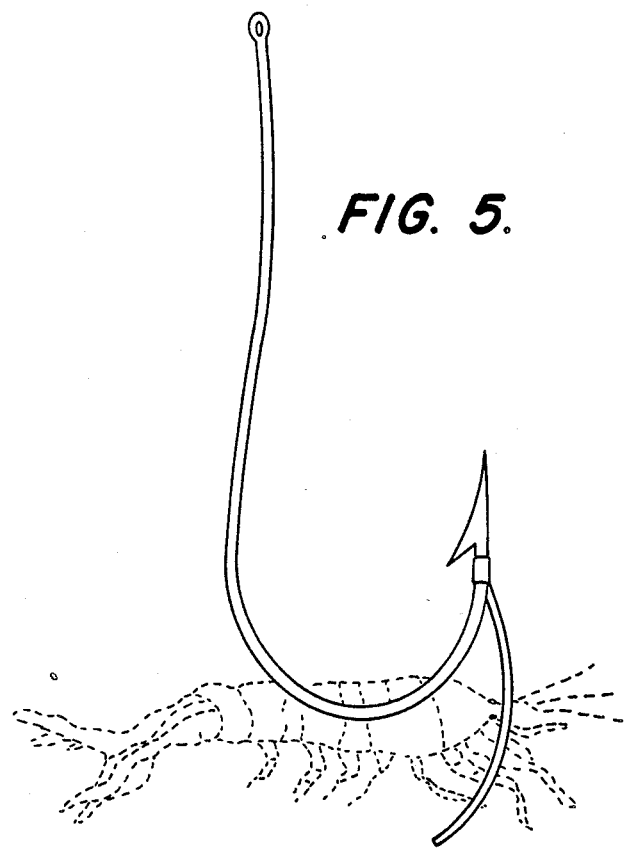

FISH HOOK WITH BAIT RETAINER

This invention relates to an improved fish hook having a simple and effective bait retention device attached thereto.

BACKGROUND OF THE INVENTION

Because of the manner in which fish "bite" it is quite possible for a fish to remove bait from a hook without actually taking the hook into its mouth far enough for the hook to engage the fish. Fish do not bite like other animals. When a fish bites, it sucks water in through its mouth and expels the water through its gills. This sucking action is the manner in which fish take food into their bodies. Since the bait is generally buoyant in water, the fish can approach the hook and suck bait away from it without taking the hook itself, causing many a lost catch.

Various devices have been made in an effort to prevent fish from removing the bait without taking the hook, but such devices have generally been found unsatisfactory because, first, they are generally made of metal thereby adding extra weight to the hook which can be felt by the fish, causing the fish to respond to the extra weight in the mouth by expelling it; secondly, the previous devices are cumbersome and take up extra space on the fishing hook and, third, they require extra effort to apply, reducing the likelihood that a fisherman will use the device. Finally, such devices frequently can be seen by the fish, causing them to avoid biting the bait. Any such devices which have been previously developed are for live bait only.

Such devices generally are made of a piece of metal mounted on or connected to the fishing hook, or a metal bail encircling the bait, or a hook with opposing gripping metal jaws or hook portions.

BRIEF SUMMARY OF THE INVENTION

Accordingly, an object of the present invention is to provide a fishing hook with a bait retainer which is made of plastic and therefore adds negligible weight to the hook, does not occupy space on the hook, is easy to apply, is invisible to the fish, and can be used for dead bait as well as live bait.

A further object is to provide a bait retention device which minimizes the possibility of the bait being removed from the hook without the hook itself being taken into the fishes mouth.

Briefly described, the invention comprises a bait retaining fish hook comprising a fish hook having an elongated, curved body portion with line retaining means at one end and a point at the other end, and a bait retaining member comprising an elongated piece of flexible non-metallic material attached at one end to the body portion adjacent the point, the other end of the material extending away from the body portion, whereby when bait is placed on the fish hook by passing the barb into a piece of bait followed by the body portion and the retaining member, the retaining member enters the bait, separates from the body portion and inhibits removal of the bait from the hook.

In another aspect, the invention includes a method of making a bait-retaining fish hook including the steps of providing a fish hook having an elongated, curved body portion with line retaining means at one end and a point at the other end, cutting a piece of thermoplastic line having a length less than the length of the hook body portion, heating the end of the body portion of the hook adjacent the point to a temperature above the softening temperature of the thermoplastic line, touching one end of the piece of line to the heated body portion near the point until the end fuses onto the hook, and cooling the hook with the line attached, thereby forming a bait retaining member attached at one end to the body portion adjacent the point, the other end of the material extending away from the body portion so that when bait is placed on the fish hook by passing the point into a piece of bait followed by the body portion and the bait retaining member, the bait retaining member enters the bait and separates from the body portion, inhibiting removal of the bait from the hook.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this specification, and wherein:

FIG. 3 is a side elevation of the baited hook of FIG. 2 showing a position assumed by the bait retaining member when removal of the bait from the point of the hook is attempted; and FIGS. 4 and 5 show side elevations of a fish hook and bait retaining member in accordance with the invention when used with other forms of bait.

DESCRIPTION OF THE PREFERRED EMBODIMENT

Figure 1:
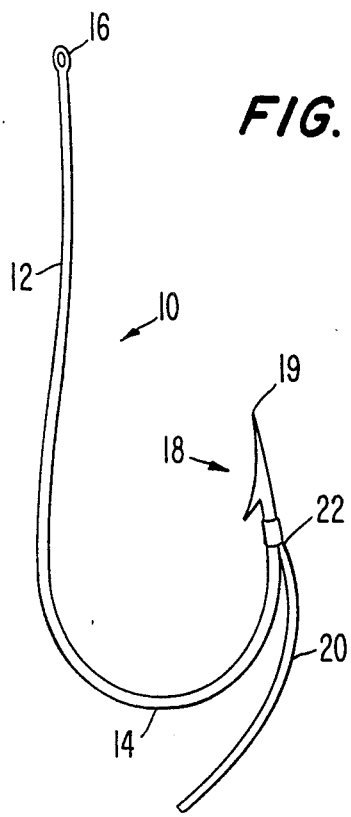
FIG. 1 is a side elevation of a fish hook with a retaining member in accordance with the present invention.

FIG. 1 shows a side elevation of a fish hook with a bait retainer in accordance with the invention. The fish hook itself, indicated generally at 10, is a conventional hook having a body portion including a shank 12 and a bend 14. At the end of shank 12 is an eye 16 which is normally connected to a snap and leader for attachment to fishing line. At the distal end of the bend is a barb indicated generally at 18 having a point 19. While the present invention is usable with any form of fish hook, including a barbless hook, a conventional barbed hook will be used in the accompanying figures.

A bait retainer 20 is shown attached to hook 10 at the end of the bend near the barb or point. Bait retainer 20 is made of a thermoplastic material and can conveniently be made using conventional polymeric fishing line such as nylon line which is light weight and is substantially invisible to the fish. The size of the line used to make retainer 20 depends upon the size of the hook with which it is used. With a hook having a total length (measured from the eye to the bend) of about 1.5 inches, a piece of 15 pound test monofilament line is quite suitable. However, the size of the fishing line is not particularly critical.

The length of the piece of line used to form retainer 20 is variable and can be as short as 1/32 inch or as long as the body portion of the hook itself, but should not be longer than the body portion. Preferably, the retainer length is in the order of the length of the bend so that it can pass into or through the bait, as will be described.

Retainer 20 is attached to the hook by heating the hook with a match, candle or the like to a temperature at or above the melting point of the plastic, touching the end 22 of the plastic line to the heated portion of the hook and holding the plastic line in position against the hook at an angle of between about 10° and 50° to allow the hook to cool and the thermoplastic to harden. The heated hook causes the line to melt and to surround the end of the body portion adjacent the barb, forming a secure attachment. The hook with its retainer is ready for use.

Care should be taken to not overheat the hook. It is only necessary to soften the end of the plastic line enough so that it engages the body portion and a very secure attachment results. The line can be cut to length before applying it to the hook but is more conveniently cut afterward. The plastic line can be held so that its natural curvature generally follows the curvature of the bend as seen in FIG. 1.

The hook and retainer can be employed in two ways as will be described. The first manner of use, illustrated in FIGS. 2 and 3, involves inserting the hook and retainer into the bait so that it remains within the body of the bait. In the second manner of use, the point, barb and initial portion of the bend passes entirely through the bait, along with the retainer, and the bait is then suspended primarily from the bend itself, the retainer being passed entirely through the bait and allowed to hang free outside of the bait as illustrated in FIGS. 4 and 5.

Figure 2:
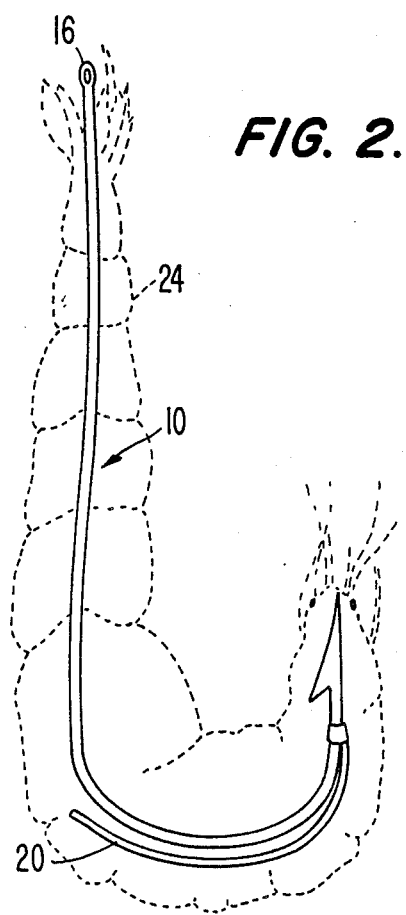
FIG. 2 is a side elevation of the fish hook and retaining member of FIG. 1 with a piece of bait on the hook.

Referring to FIGS. 2 and 3, the hook 10 can be inserted into the body of the bait 24 so that the hook, including the point, is substantially totally concealed within the bait body. The retainer 20 tends to lie along the body portion of the hook as shown in FIG. 2 when the point, followed by the bend and shank, are "threaded" into the bait. However, any effort to remove the bait from the hook causes the material of the bait itself to push against the distal end 26 of retaining member 20, causing the retaining member to separate from the body portion of the hook, trapping material of the bait therebetween and inhibiting removal of the bait from the hook. With the retainer in this position, it is substantially impossible for a fish to remove the bait from the hook without ingesting the hook itself which is the desired result.

As will be recognized, the natural resilience of the fishing line itself contributes to this action, the fishing line being a flexible but rather stiff plastic material. If other materials are used to make the retaining device, they should have characteristics similar to nylon monofilament line.

Referring now to FIGS. 4 and 5 which show the second manner of use, it will be recognized that the hook 10 and retainer 20 can be used by passing the point, barb and end of the bend entirely through the bait as illustrated in the two figures such that the retainer member 20 passes therethrough and hangs freely from its junction 22 with the body portion of the hook. As will be recognized, any effort to remove the bait from the hook by pulling it across the barb encounters the rather stiff resistance of the retaining member. With this in mind, the retaining member should be held so that it forms an acute angle with the portion of the bend to which it is attached when the melting and fusion to the hook body portion is first accomplished. The retaining member then has a natural angle which inhibits removal of bait applied in the manner of FIGS. 4 and 5.

The hook and retainer described herein can be used for either live or dead bait. Since the retainer is made of fishing line which is light in weight and takes up essentially no additional space on the hook, it does not do any more damage to live bait than the hook would do without the retainer applied.

In use, the retaining hook requires no motion or effort other than that required to bait the hook normally. As bait is threaded onto the hook the retaining member lies essentially flat against the bend portion of the hook and occupies little space. However, once the hook has been baited, the natural spring in the retaining member causes it to separate from the body portion as described above.

In either manner of application, the retainer prevents fish from sucking bait from the tip 19 or barb 18 of the hook which means that the only way the fish can remove the bait is to tear it off. This gives the fisherman a good bite which is the desired result in sport fishing.

The apparatus of the invention provides a bait retaining fishing hook which is effective to prevent bait from being sucked from the tip of a fish hook, the structure is light weight and substantially invisible to the fish, takes no extra effort to apply, is inexpensive to use and simple to install, does not interfere with the normal characteristics of the baited hook and does not destroy the natural appearance of the bait.

It will also be recognized that a dough ball can be used with the present invention by applying the dough around the end of the hook in the conventional fashion. Dough bait is generally wrapped around the hook rather than being threaded onto it. Such bait is normally more easily sucked from the hook because it is basically a water mixture and tends to soften and come off of the hook in water and because it does not have enough surface to hold onto. The present invention provides additional surface for dough bait allowing even that form of bait to be used more effectively.

While one advantageous embodiment has been chosen to illustrate the invention, it will be understood by those skilled in the art that various changes and modifications can be made therein without departing from the scope of the invention as defined in the appended claims.

What is claimed is:

1. A bait-retaining fishhook comprising
   a fishhook having an elongated, curved body portion with line retaining means at one end and a point at the other end; and
   a bait retaining member comprising an elongated piece of flexible non-metallic material fixedly attached adjacent said point and divergingly following said curved body portion of said fishhook
   whereby when bait is placed on said fishhook said bait retaining member is separated from said body portion and inhibits removal of the bait from said hook.

2. A bait-retaining fishhook comprising
   a fishhook having an elongated, curved body portion with line retaining means at one end and a point at the other end; and
   a bait retaining member comprising an elongated piece of flexible non-metallic material fixedly attached adjacent said point and divergingly following said curved body portion of said fishhook
   whereby when bait is placed on said fishhook by passing said point into a piece of bait followed by said body portion and said bait retaining member, said bait retaining member enters said bait, separates from said body portion and inhibits removal of the bait from said hook.

3. A fishhook according to claim 2 wherein said elongated piece of flexible material comprises a length of monofilament fishing line made of a thermoplastic polymeric material.

4. A method of making a bait-retaining fishhook including the steps of provided thermoplastic line and a fishhook having an elongated, curved body portion with line retaining means at one end and a point at the other end, heating the end of the body portion of the hook adjacent the point to a temperature above the softening temperature of the thermoplastic line, touching one end of a piece of the thermoplastic line to the heated body portion adjacent the point until the end fuses onto the hook, and cooling the hook with the end of the line attached, thereby forming a bait retaining member attached at one end to the body portion adjacent said point, the other end of said material extending away from the body portion so that when bait is placed on the fishhook by passing said point into a piece of bait followed by the body portion and the bait retaining member, the bait retaining member enters the bait and separates from the body portion, inhibiting removal of the bait from the hook.

5. A method according to claim 4 wherein the thermoplastic line is monofilament fishing line.

6. A method according to claim 4 wherein the step of cooling is followed by the step of cutting the thermoplastic line to a length no greater than the length of the hook.

7. A method according to claim 4 and including cutting the thermoplastic line to a length no greater than the length of the hook before touching the line to the heated body portion.

* * * * *